United States Patent [19]

Berti

[11] 4,196,526
[45] Apr. 8, 1980

[54] DRYING PLANT, PARTICULARLY FOR TIMBER

[75] Inventor: Furio Berti, Turin, Italy
[73] Assignee: CEAF S.p.A., Turin, Italy
[21] Appl. No.: 8,651
[22] Filed: Jan. 30, 1979
[30] Foreign Application Priority Data Oct. 26, 1978 [IT] Italy .................. 69465 A/78

[51] Int. Cl.² ........................... F26B 21/10
[52] U.S. Cl. .......................... 34/77; 62/93;
62/324; 62/238; 34/13.4
[58] Field of Search .......... 62/90, 93, 324 C, 324 D, 62/238 E; 34/77, 46, 9.5, 13.4, 13.8, 16.5, 50

[56] References Cited

U.S. PATENT DOCUMENTS

| 3,337,967 | 8/1967 | Smith | 34/46 |
| 3,744,144 | 7/1973 | Weis | 34/50 |
| 3,940,860 | 3/1976 | Unterreiner | 34/46 |

FOREIGN PATENT DOCUMENTS

| 1533651 | 11/1978 | United Kingdom | 34/13.4 |
| 244191 | 10/1969 | U.S.S.R. | 34/13.4 |

*Primary Examiner*—Larry I. Schwartz
*Attorney, Agent, or Firm*—Sughrue, Rothwell, Mion, Zinn and Macpeak

[57] ABSTRACT

A timber drying plant has a drying chamber through which air may be circulated by a fan in a circuit which includes a refrigerating unit. The refrigerant fluid circuit of the unit includes a dehumidification evaporator for outlet air and a condenser in the recycle air flow for returning to the latter least part of the heat extracted by the evaporator. The refrigerant fluid circuit also includes an auxiliary evaporator with control valve means whereby the auxiliary evaporator can be inserted in said fluid circuit so that the refrigerating unit operates as a heat pump absorbing heat from the external atmosphere through the auxiliary evaporator. A supplementary evaporator may also be included in the refrigerating unit and is connectable in parallel with the auxiliary evaporator to increase the heat pump effect. In another position of the control valve means the auxiliary evaporator acts as a condenser in circuit with the dehumidification evaporator to reduce the heating of the recycled air.

7 Claims, 6 Drawing Figures

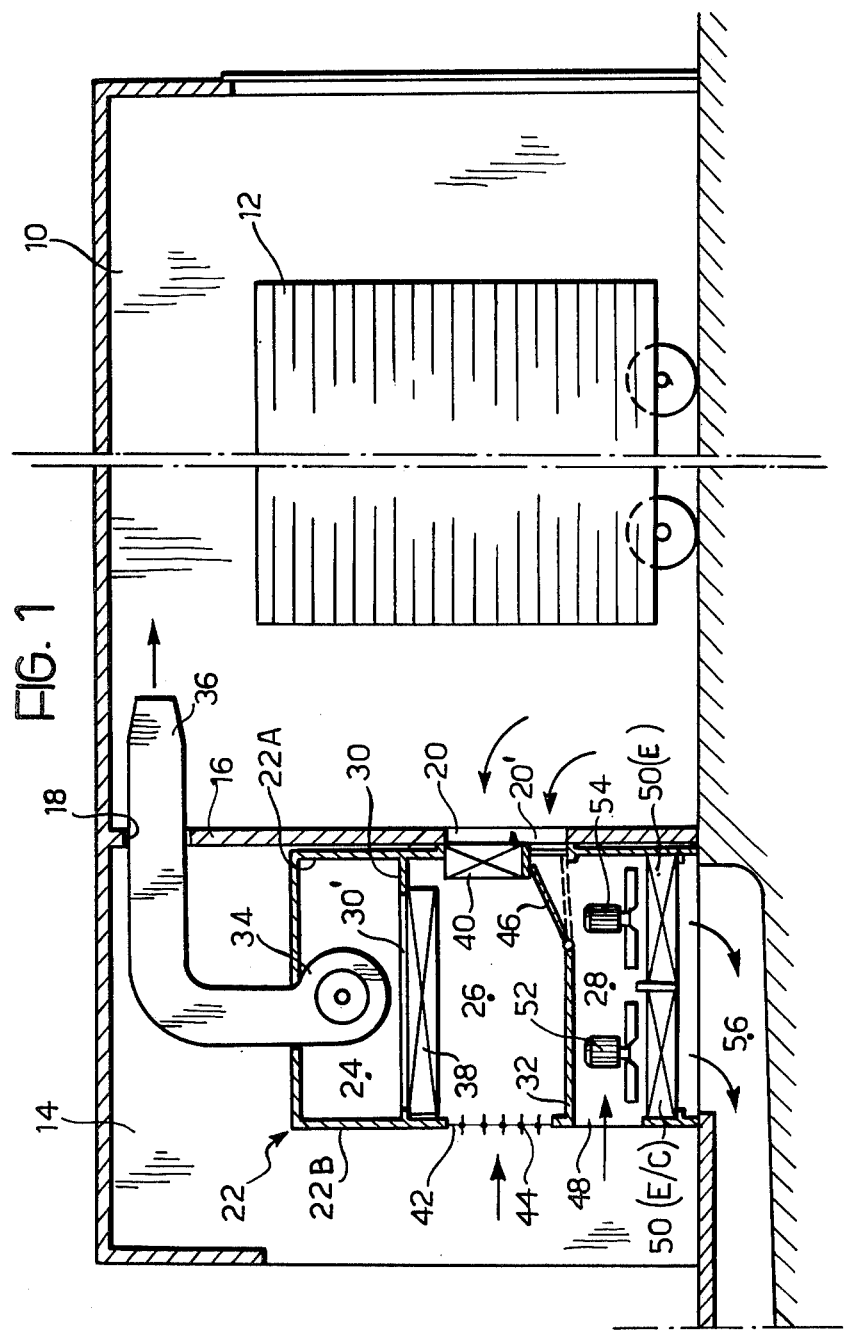

DRYING PLANT, PARTICULARLY FOR TIMBER

BACKGROUND OF THE INVENTION

The present invention relates to plant for drying any of a variety of materials including vegetable materials such as wood, coffee, cocoa, tobacco, fodder, etc. and animal materials such as leather, fish, cheese, etc.

More particularly, the invention concerns plant for drying materials, particularly timber, by air circulation, comprising a drying chamber having air inlet and air outlet ports for the circulation of air in the chamber, and a refrigerating unit for the dehumidification of the air, said refrigerating unit comprising a refrigerant fluid circuit including a compressor, means defining an air flow path through the refrigerating unit including a fan for forcing air through the said inlet port, a dehumidification evaporator located in the path of flow of air from the outlet port of the drying chamber, and a condenser located in the path of inlet air flow to the inlet port to restore to the inlet air flow at least part of the heat extracted from the outlet air by said dehumidification evaporator.

Plants of the type specified above have been available commercially for a number of years all over the world. Such plants are based on the principle that the drying air is circulated in a closed circuit which includes the drying chamber and the refrigerating unit, the air issuing from the drying chamber being dehumidified by refrigeration and the current of air thus dehumidified being reheated and reintroduced into the chamber. The drying process is carried out over several days, the relative humidity (R.H.) of the air in the drying chamber being lowered progressively, thereby stimulating the emergence of moisture from the interior to the surface of the material, where the moisture is removed by the circulating air.

Drying processes using such plants led to significant advantages over drying systems which were previously in use, as regards the speed and economy of the drying treatment, especially as applied to timber. In fact it has become possible to dry out timber in this way in a relatively short period of time, reducing its residual moisture content to 16–20%, depending on he species. Unfortunately, however, any further reduction of the residual moisture encounters many difficulties and requires long periods of time, and a residual moisture content of 6–8%, which many users of timber are now seeking, is almost impossible to achieve, especially for hardwoods such as oak, teak and afromosia, in thicknesses greater than about 60 mm. Indeed such drying would require, in the first place, such a long processing time as to make the system uneconomic, and in the second place the residual humidity of the circulating air in the chamber would have to be reduced to such low values that the wood would tend to become "cemented" (a term used to denote occlusion of the pores in the surface layers of the timber), with resultant cracks and distortion. Moreover, apart from this, prolonged periods of drying may easily lead to mould growth.

It is possible to augment the degree of drying of timber by means of high temperature steam treatment, but this involves considerable expenditure on plant and operating costs, so that such methods have hitherto been used only by large concerns. The conditions for this treatment are very critically dependent on the various types of wood. One of the attendant risks is that of discoloration, which it is absolutely essential to avoid for such varieties of wood as mahogany, walnut, rosewood, teak and mansonia, where colour is the most valuable attribute commercially. Another risk is that of collapse of the fibres, and flaws in the material caused by too sharp a rise in temperature. Furthermore, contact with high temperature steam can lead to shrinkage and a resulting loss of thickness.

An object of the present invention is to provide a process for drying material such as timber to an extremely low residual moisture content, even to within the range of 6–8%, and at high speeds, using plant of low cost which is inexpensive to operate.

SUMMARY OF THE INVENTION

According to the invention there is provided a plant for drying materials, particularly timber, by air circulation, comprising a drying chamber having an inlet port and an outlet port for the circulating air, and a refrigerating unit comprising a compressor, a fan for forcing air through the air inlet port into the drying chamber, a dehumidification evaporator associated with the air outlet port from the drying chamber, and a condenser located in the inlet air flow path through the refrigeration unit to restore to the said inlet air flow at least some of the heat extracted from the outlet air by the dehumidification evaporator, the refrigerating unit further including an auxiliary evaporator exposed to the atmospheric air and valve means for switching said auxiliary evaporator into and out of the refrigerant fluid circuit of said refrigerating unit, whereby the refrigerating unit operates as a heat pump absorbing heat from the atmospheric air when said auxiliary evaporator is switched into said circuit.

Preferably the said valve means have a control position in which said auxiliary evaporator is interposed in the refrigerant fluid circuit in substitution for the dehumidification evaporator, and the outlet port of the drying chamber has an associated first damper movable between a closed position in which substantially the whole of the air flow from the drying chamber passing through said outlet port is recycled to the inlet port through the condenser, and an open position in which part of said air flow is discharged to the outside through said auxiliary evaporator, said plant further including a second damper associated with air inlet side of the condenser, said second damper being movable between a closed position in which said inlet side of the condenser receives air only from the said outlet port, and an open position in which the said condenser receives air also from the external atmosphere.

In a preferred embodiment of the invention the valve means also provide a control position in which said auxiliary evaporator is interposed in the refrigerant fluid circuit between the delivery port of the compressor and the condenser, while the dehumidification evaporator also remains interposed in said circuit, so that said auxiliary evaporator acts as a condenser dissipating heat to the atmosphere, thereby reducing heat imparted by the condenser of the refrigerating unit ("main condenser") to the air being recycled into the chamber through the said inlet port.

The refrigerating unit may further include a supplementary evaporator exposed to the atmospheric air, said supplementary evaporator being disposed so as to be traversed by the flow of air discharged to the outside when the said first damper is in its open position, further valve means being provided for interposing said supplementary evaporator in the refrigerant fluid circuit in parallel with the auxiliary evaporator.

In a preferred practical embodiment of the invention the refrigerating unit is contained in a cabinet which is divided into three compartments: a middle and two end compartments, e.g. a top- and a bottom compartment. In this embodiment the cabinet is adjacent the drying chamber in such a manner that the dehumidification evaporator located in the middle compartment obstructs an upper part of the outlet port of the drying chamber, one of the external walls of the middle compartment having a window which communicates with the outside under control of the said second damper. The middle compartment communicates with one of the end compartments, preferably the top compartment, through the main condenser, the fan being positioned so as to draw air from the top compartment and to blow it into the drying chamber through the inlet port. The auxiliary evaporator (and the supplementary one if there is one) is situated in the opposite end compartment, preferably the bottom one, which communicates with the outside air and which, under control of the first said damper, can be put in communication with the part of the outlet port unobstructed by the dehumidification evaporator. The bottom compartment preferably also communicates with a discharge duct through both the auxiliary evaporator and the supplementary evaporator, each of these evaporators being equipped with a fan which, when the respective evaporator is in operation, draws air from the said bottom compartment and discharges it into the said discharge duct through the respective evaporator.

BRIEF DESCRIPTION OF THE DRAWINGS

FIG. 1 is a vertical longitudinal cross-sectional view of a plant according to the invention;

DETAILED DESCRIPTION

Figure 1A:
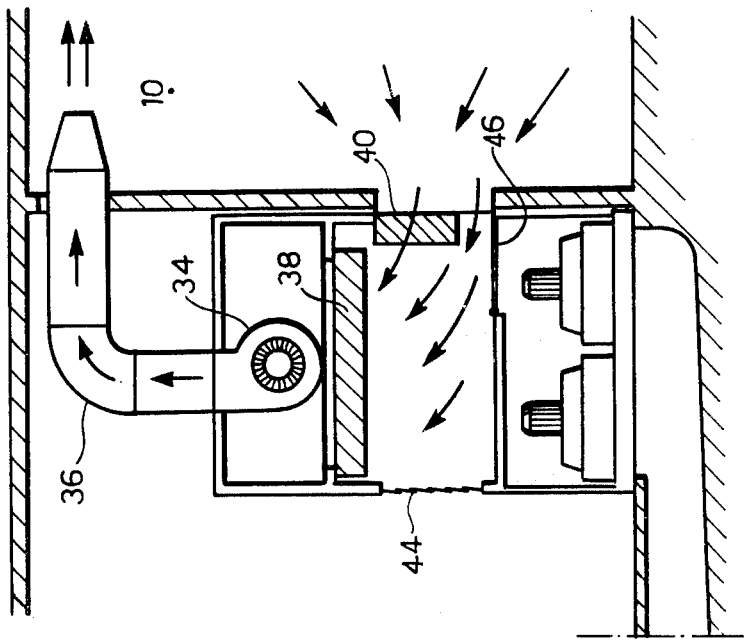
FIGS. 1A, 1B, 1C and 1D illustrate the refrigerating unit of the plant shown in FIG. 1 in four different stages of operation.

The illustrated plant includes a drying chamber 10, normally sealed off from the external surroundings and loaded with timber 12 to be dried. Adjoining one end of the chamber 10 is a machine room 14, separated from the chamber 10 by a vertical partition 16. An air inlet port 18 of rectangular form is formed in an upper part of the partition 16 and air outlet port 20, also of rectangular form, is provided in a lower part of the partition 16.

A refrigerating unit is housed in a cabinet 22 located inside the machine room 14. The cabinet 22 has a vertically oriented parallelepipedic shape, one vertical wall 22A of which directly adjoins the partition 16 and within which there are an upper, a middle and a lower compartment 24, 26, 28, respectively, separated by horizontal partitions 30, 32.

The upper compartment 24 communicates with the drying chamber 10 through a centrifugal fan 34 which is located in the compartment 24 and which draws air from the compartment, blowing it into the drying chamber 10 through an inlet duct 36 which extends airtightly through the inlet port 18. The upper compartment 24 communicates with the middle compartment 26 through a rectangular aperture 30' in the partition 30 adjacent which a condenser 38 ("main condenser") is located. The flow of air delivered to the inlet duct 36 by the fan 34 may be thus heated by the main condenser 38 when the refrigerating unit is in operation.

The middle compartment 26 is substantially at the same height as the outlet port 20. An opening in the vertical wall 22A of the cabinet 22 coincides with the port 20, the upper part of this opening being filled by a dehumidification evaporator 40, leaving only a lower part 20' of the port 20 unconvered. In the vertical wall 22B of the cabinet 22 opposite the wall 22A, there is a rectangular window 42 through which the airflow is controlled by a damper 44 with rotatable louvres, shown in FIGS. 1 and 1A in its open position and in FIGS. 1B, 1C and 1D in its closed position. When the damper 44 is open the middle compartment 26 is in communication with the surrounding external air.

A portion of the horizontal partition 32 adjacent the wall 22A (and consequently adjacent the port 20) is hinged to the remaining fixed part of the partition 32 so as to constitute a hinged damper 46. The damper 46 is shown in FIG. 1 by a full line in its lifted (open) position and by a broken line in its lowered (closed) position. The damper 46 controls air flow through the lower part 20' of the port not obstructed by the dehumidification evaporator 40. In the lifted position of the damper 46 (FIGS. 1 and 1A) the interior of the drying chamber 10 is in communication through the lower part 20' of the port 20, with the lower compartment 28, whereas in the lowered position of the damper 46 (FIGS. 1B, 1C, 1D) the drying chamber is in communication through the said lower part 20' of the port 20 with the middle compartment 26. In the lowered position of the damper 46, with the damper 44 closed, only part of the air flows through the port 20 into the central compartment 26 is dehumidified by the evaporator 40; this is advantageous because excessive drying of the recycled air could result in too dry an atmosphere in the drying chamber 10, with all the adverse consequence which this could lead to.

The lower compartment 28 communicates with the outside environment through a window 48 which is suitably protected by means of a grille (not shown). Two evaporators 50(E) and 50(E/C) are located side by side in the bottom of the compartment and are equipped with respective fans 52, 54. The evaporator 50(E) is disposed in proximity to the part 20' of the outlet port 20 of the chamber 10, while the evaporator 50(E/C) is disposed in proximity to the window 48.

The two fans 52, 54 draw air from the compartment 28 and blow it through the respective evaporators 50(E/C), 50(E) into an exhaust duct 56, the free end of which (not shown) is located at a suitable distance away from the plant so as to ensure that the discharged air will not mix with the air entering through the windows 42, 48. The evaporator 50(E/C), herein referred to as the "auxiliary evaporator" is a heat exchanger which may act as an evaporator or as a condenser (hence the suffix E/C), whereas the evaporator 50(E) is intended to perform solely as an evaporator and is herein referred to as the "supplementary evaporator". When the damper 46 is in its raised position (FIG. 1) the lower compartment 28 receives air through the port 20 from the drying chamber 10 which prevails over the outside air entering the compartment 28 through the window 48, since a superatmospheric pressure is generated in the drying chamber 10 by the fan 34; under these conditions the two evaporators 50(E) and 50(E/C) act almost exclusively on the air drawn from the drying chamber 10, even if the window 48 is permanently open (FIG. 1A).

The cabinet 22 also contains the compressor 60 and related pipework of the refrigeration unit (FIG. 2) as well as an electrical control system for the electrically energized devices of the unit.

The delivery port of the compressor (FIG. 2) is connected to the main condenser 38 through a pipe 62 which includes a solenoid-operated three-way valve 64 followed by a non-return valve 66.

Refrigerant fluid which has been liquified in the condenser 38 is discharged from the latter through a pipe 68 into the liquid receiver 70, the outlet from which is connected through a filter 72 and a pipe 74 to a conventional thermostatic expansion valve 76 connected to the inlet of the dehumidification evaporator 40. The flow of liquid through the pipe 74 is controlled by a solenoid valve 78 which can be operated to halt the flow of refrigerant to the evaporator 40. The outlet from the evaporator 40 is connected to the inlet port of the compressor 60 through a pipe 80 and a liquid separator 82, completing a closed refrigerant circuit.

Figure 2:
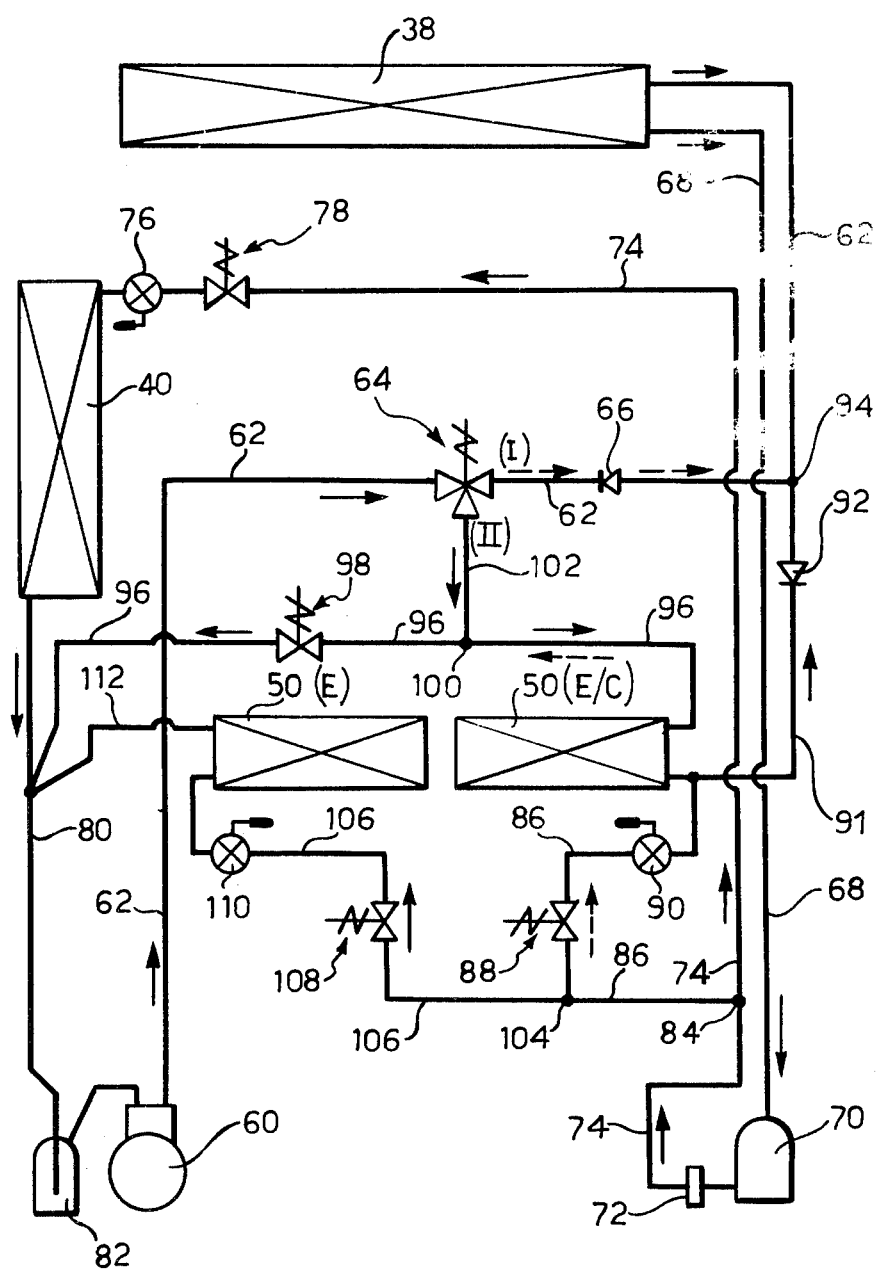
FIG. 2 is a circuit diagram of the refrigerating unit of the plant.

In FIG. 2 the two outlets from the three-way valve 64 are marked (I) and (II). When the valve 64 is in the position (I) the main condenser 38 is fed through the non-return valve 66. At a point 84 on the pipe 74 upstream of the solenoid valve 78 a branch pipe 86 is branched and leads to one of the connections of the auxiliary evaporator 50(E/C) through a solenoid valve 88 followed by a thermostatic expansion valve 90, the same connection of the evaporator also being connected through a pipe 91 and a non-return valve 92 at a point 94 in the pipe 62 located between the non-return valve 66 and the main condenser 38. The other connection of the auxiliary evaporator 50(E/C) is connected through a pipe 96 and a solenoid valve 98 to the discharge pipe 80 of the dehumidification evaporator 40 which leads into the liquid separator 82. Thus with the valve 64 in its position (I), the valve 78 closed and the valves 88 and 98 open, the dehumidification evaporator 40 is shut-off and the liquid refrigerant flows from the receiver 70 through the auxiliary evaporator 50(E/C) from which refrigerant vapour flows into the compressor 60 through the pipes 96 and 80. In this case the auxiliary evaporator 50(E/C) acts as evaporator. The liquid from the pipe 86 cannot flow back into the main condenser 38 through the pipe 91 because the pressure in the pipe 62 is greater than that in the pipe 86, so that the non-return valve 92 remains closed.

At a point 100 in the pipe 96 located between the evaporator 50(E/C) and the solenoids valve 98 a pipe 102 is branched and leads from the pipe 96 to the outlet (II) of the three-way valve 64. When, therefore, the valve 64 is in its position (II) while the valves 88 and 98 and the valve 78 are open the evaporator 50(E/C) is effectively connected in series (through the pipes 102, 96, 91 and 62) with the main condenser 38 and in this case acts as a supplementary condenser.

Finally, the inlet of the supplementary evaporator 50(E) is connected to a point 104 in the pipe 86 located upstream of the solenoid valve 88 through a pipe 106 which includes a solenoid valve 108 followed by a thermostatic expansion valve 110. The outlet of the supplementary evaporator 50(E) is connected through a pipe 112 to the discharge pipe 80 of the dehumidification evaporator 40. Thus, when the three-way valve 64 is in position (I) while the valves 88, 98, 108 are open and the valve 78 is closed the dehumidification evaporator 40 is shut-off and the two evaporators 50(E) and 50(E/C) are connected in parallel between the point 84 in the pipe 74 conveying refrigerant liquid and the discharge pipe 80 leading to the liquid separator 82; in these conditions the evaporators 50(E) and 50(E/C) both act as evaporators proper.

OPERATION

The opening and closing of the solenoide valves 64, 78, 88, 98, 108 and of the dampers 44, 46 are controlled and coordinated by an electrical control circuit which will appear obvious to those skilled in the art from the following description of the various stages of operation. In its most elementary form such an electrical control circuit can be operated manually according to humidity measurements made by hygrometers (not shown) placed inside the drying chamber 10 and within the load of timber 12. Preferably, however, instead of hygrometers use is made of hygrostats and thermostats connected to the electrical control circuit for automatic control in dependence on the temperature and humidity measured in the drying chamber 10 and in the timber 12.

A typical working cycle of the plant described above is made up essentially of four consecutive stages, tabulated in Table I below together with the positions assumed at each stage by the dampers 44, 46 and by the solenoid valves 64, 78, 98, 88 and 108. In Table 1 the symbol O denotes an open position and the symbol =- denotes a closed position of a valve.

TABLE 1

| Stage | Position of dampers | | Position of solenoid valve | | | | |
|---|---|---|---|---|---|---|---|
| | 46 | 44 | 108 | 88 | 78 | 98 | 64 |
| (1) Expulsion of air under heat pump conditions | O | O | O | O | = | O | (I) |
| (2) Dehumidification | = | = | = | = | O | = | (I) |
| (3) Dehumidification with expulsion of heat | = | = | = | = | O | = | (II) |
| (4) Heat pump | = | = | O | O | = | O | (I) |

The operation of the plant in the four different stages (1) to (4) is indicated diagrammatically in FIGS. 1A-1D respectively. In FIGS. 1A, 1B, 1C and 1D the condensers and evaporators which are in action during the respective operational stages are identified by hatching.

In Stage (1), FIG. 1A, when freshly sawn timber is loaded into the drying chamber 10 the tendency is for the air in the chamber 10 to reach a relative humidity (R.H.) of the order of 85-90%, substantially in equilibrium with the moisture content of the timber. Continuous drying of the air as full of moisture as this, by ordinary expedient of recycling the air through the dehumidification evaporator 40 and condenser 38, would entail considerable energy consumption. In the plant according to the invention advantage is taken during stage (1) on the fact that the relative humidity of the external ambient air usually is of the order of 60-65% or even lower. In this stage, therefore, part of the damp air inside the chamber 10 is continually being replaced by external ambient air and the inflow of ambient air is heated by the heat recovered from the air being discharged from the chamber 10 (and by the heat equivalent of the mechanical work done by the compressor and its associated motor in the refrigeration unit). These conditions are illustrated in FIG. 1A, taking into account the positions of the dampers and valves as listed for stage (1) in Table I. The dampers 44, 46 are in this stage in their open positions so that the fan 34 draws through the condenser 38 both the air from the external atmosphere and the damp air from the chamber 10, the latter air not being dried because the dehumidification evaporator 40 is out of action (that is, valve 78 closed, Table 1). At the same time, the air expelled from the drying chamber 10 flows through the two evaporators 50(E) and 50(E/C) which both act as the equivalent of a single evaporator with a large heat exchange surface, and which absorb from this air current both the sensible heat and the heat of condensation. The heat absorbed in this way is "pumped" into the condenser 38.

Operation under the stage (1) conditions is continued until the relative humidity of the air in the drying chamber 10 approximates substantially to that of the ambient air, that is to say, for example, about 70%, whereupon stage (1) is ended. It is only for certain hardwood timber species such as for example, oak, teak, or rosewood, that stage (1) needs to be terminated at higher levels of humidity.

Figure 1B:
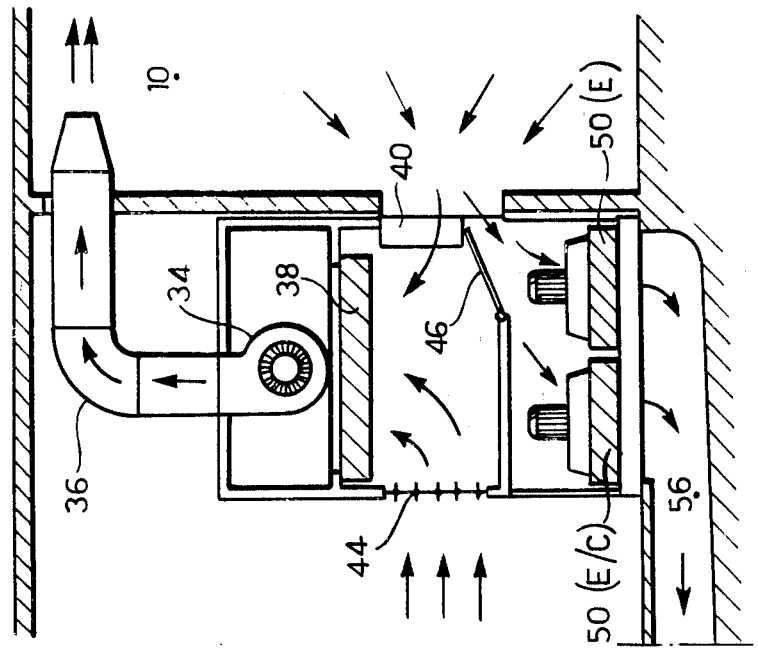

Stage (2), illustrated in FIG. 1B, is a conventional dehumidification stage under heat-recovery conditions, with the temperature in the drying chamber 10 being below a certain limiting value. In the case of timber a suitable limiting value might be 35°-40° C. since at higher temperatures there would be risk of "cementation". From Table 1 and FIG. 1B, it can be seen that only the condenser 38 and the dehumidification evaporator 40 are in action, the dampers 44 and 46 connecting the chamber 10 with the atmospheric air being closed. Hence a closed circulation of air takes place. The current of air through the evaporator 40 is dried by cooling and the heat extracted by the evaporator 40 is all reintroduced into the recycle air by the condenser 38.

Stage (3) is a dehumidification stage which is carried out when the temperature of the air in the drawing chamber exceeds the above-mentioned limiting value. In such case it is necessary to expel the excess heat, which must however be done without expelling the air. It will be seen from Table 1 and FIG. 1C, which illustrates stage (3), that in addition to the dehumidifying evaporator 40, the refrigerating circuit effective in this stage also includes the auxiliary evaporator 50(E/C) which in this stage acts as condenser. The fan 52 draws atmospheric air from the outside through the window 48, and this air carries away the heat from exchanger 50(E/C) and is discharged to the atmosphere through the duct 56. Heat is therefore dissipated by the heat exchanger 50(E/C) acting as condenser, leaving only a residual amount of heat to be restored to the current of air being recycled to the chamber 10 by the main condenser 38.

Stage (2), or stage (3) as the case may be, terminates when the relative humidity of the air in the drying chamber has finally dropped to a predetermined value, which for ordinary timber is around 60%, or for hardwoods such as oak and teak may be 75-80%, whereupon the changeover to stage (4) takes place.

Figure 1C:
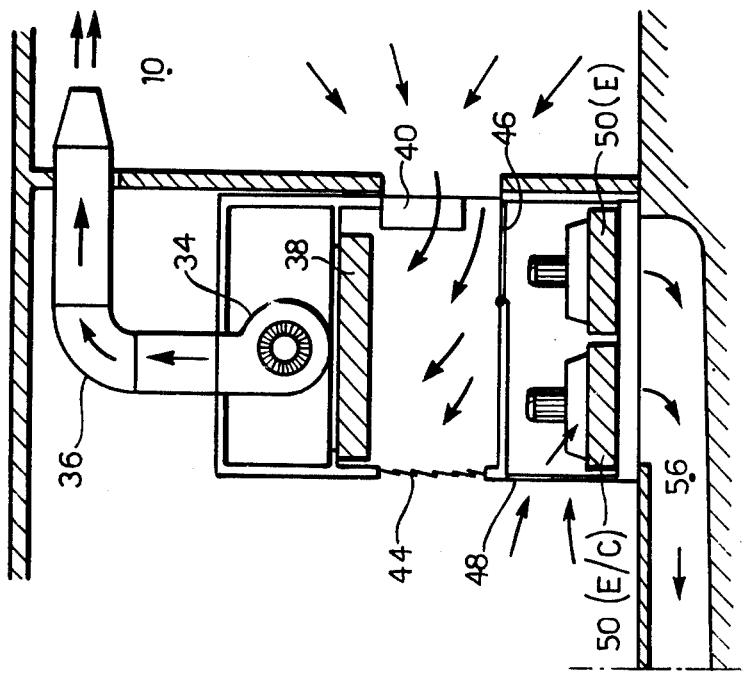
Figure 1D:
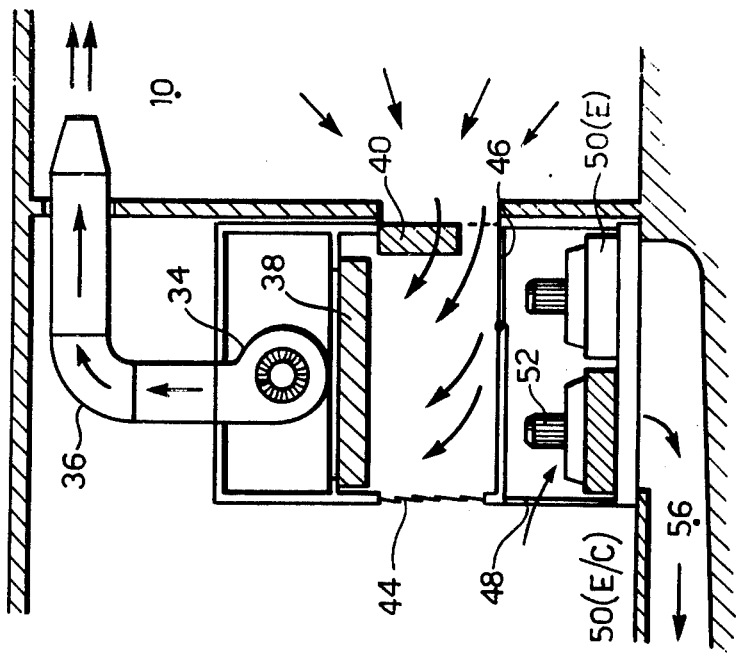

In Stage (4) the plant functions as a heat pump, as illustrated in FIG. 1D. In this stage it is important to continue the drying process by making the air circulate in a closed cycle at a moderately high temperature under controlled relative humidity conditions of the air in the chamber, until the moisture content of the timber is decreased to about 20-25%. During operation as heat pump in this stage both evaporators 50(E) and 50(E/C) operate as evaporator, absorbing heat from the current of air drawn from the outside. Heat extracted from this current of air is pumped to the condenser 38 which transfers it to the flow of air created by the fan 34 for recycling to the drying chamber 10. Part of this heat is absorbed by the timber in the form of latent heat, while the remaining part tends to raise the temperature in the chamber 10, which in turn leads to a lowering of the relative humidity despite the evaporation of moisture from the timber. If the relative humidity of the air in the chamber 10 were to drop below about 40-50% (while the humidity of the timber was still above 25%) there would be a serious risk of cementation. For this reason the dehumidification evaporator 40 is shut-off in this stage and indeed the need may even arise for humidification of the air in the chamber 10 by means of suitable water sprays (not shown) located for example in the air inlet duct 36. The necessary control of these humidity conditions can easily be made automatic by means of hygrostats located in the atmosphere of the chamber 10 and in the body of the timber 12. At the same time the temperature inside the chamber 10 should preferably be maintained in proximity to the range of 45°-55° C. without, however, exceeding this range, so as to avoid damage to the timber. Should the temperature in the chamber 10 rise above this range, one of the two evaporators 50(E), 50(E/C) may be shut-off by closure of the related valves 88 or 108, or the refriregating unit may be stopped altogether, leaving only the fan 34 operating unit the temperature falls to a level in the range 45°-55° C. It is only when the moisture content of the timber has dropped to 20-25% (as detected by a hygrostat located amid the timber) that intensive drying can be effected under the conditions shown in FIG. 1D, that is to say by operation of the unit as a heat pump, so as to increase the temperature in the chamber to 60°-70° C. with consequent lowering of the relative humidity to 15-20% and even less, without damage to the timber. The maximum attainable temperature depends on what refrigerant fluid is used for the circuit in FIG. 2 and more precisely on the temperature at which condensation occurs in the condenser 38 at the outlet pressure of the compressor 60. For example, of the various brands of "Freon" (R.T.M.) the most suitable is "Freon 12" (R.T.M.) the condensation point of which can be brought up to something around 80° C. under a few atmospheres pressure, whereby, by operating the stage (4) as described above, the initial moisture content of the timber at this stage (20-25%) can be reduced in a few days to values as low as 6-8%.

Since, during the greater part of the drying cycle as a whole, the plant according to the invention is acting as a heat pump, it is exceptionally economical in operation. Admitting that one kWh is theoretically equivalent to 860 Cal, the plant according to the invention yields about 3500 Cal from every consumed kWh. As compared with the use of gas oil as a fuel, the energy saving is around 40%. It will be apparent that the performance of the plant depends on the temperature of the ambient air. The best performances are those corresponding to ambient temperatures from about 10° C. to about 40° C., and this means that the plant according to the invention can be employed successfully anywhere in a moderate or medium-hot climate. In cold climates, during periods when the ambient temperature drops to about 6-7° C. it is a relatively simple matter to utilise an emergency source of heat such as, for example, an electrical resistance heater, solar panels, or heat exchange with relatively warm effluents discharged by neighbouring industry.

By way of practical illustration, without any limitation, it is noted that a plant like that described above with a 20 HP compressor can dry out a load of timber of 50-70 cubic meters, depending upon the species of wood, while with a 40 HP compressor it is possible to dry out timber loads of 100-150 cubic meters. The drying times, using automated plants controlled by hygrostats and thermostats, are in every case substantially shorter than the times normally required by known plants hitherto employed, and they approximate very closely to the limit-values imposed by the transmigration rate of moisture within the various species of wood. The following example is given as a further illustration.

EXAMPLE

Sipo mahogany (Entrandrophragma utile Spr) is known to be among the species of wood for which seasoning has not hitherto been easily practicable. The present example shows the ease with which this actual species can success fully be dried out by the use of a plant in accordance with the invention.

The load 12 in the chamber 10 consists of 50 m³ of Sipo mahogany in the form of freshly sawn boards 50 mm thick. Initially the internal moisture content of the wood is above 60% and is continually monitored by means of humidostat probes placed in some of the boards. The compressor 60 is rated at 20 HP. The running conditions of the plant are given in Table 2:

TABLE 2

| Time (hours) | Stage | Ambient air °C. min-max | Ambient air R.H. % min-max | Air in chamber 10 °C. | Air in chamber 10 R.H. % | Internal moisture content of wood (%) |
|---|---|---|---|---|---|---|
| 0 | (1) | 13-24 | 70-75 | 19 | 98 | >60 |
| 24 |   | 9-21 | 70-75 | 22 | 92 | >60 |
| 48 |   | 11-15 | 75-80 | 24 | 80 | 58 |
| 72 |   | 13-20 | 70-80 | 26 | 75 | 55 |
| 96 | (2) | 13-20 | 65-70 | 32 | 62 | 46 |
| 120 |   | 13-20 | 70-75 | 36 | 55 | 40 |
| 144 |   | 14-22 | 80-85 | 45 | 40 | 32 |
| 168 | (3) | 13-21 | 70-75 | 48 | 34 | 26 |
| 192 |   | 12-20 | 70-75 | 50 | 28 | 22 |
| 216 | (4) | 13-25 | 65-70 | 58 | 22 | 18 |
| 240 |   | 14-26 | 65-70 | 60 | 18 | 16 |
| 264 |   | 15-26 | 60-65 | 62 | 15 | 14 |
| 288 |   | 15-24 | 60-65 | 62 | 14 | 9 |

At the elapse of 288 hours (12 days) the plant was stopped and the load was left standing for 24 hours. As a result the residual internal moisture content of the wood had fallen to a value between 9% and 8%. No cracking, distortions or discolouration were found. The total consumption of electrical energy (including the fans and compressor motor) amounted to 5104 kWh.

It should be noted that in practice one or other or both of the two dehumidification stages herein described may be unnecessary (especially when the wood is not freshly sawn or in the case of hardwoods with a relatively low initial moisture content) particularly if such dehumidification stages would lead to excessively low values of the relative humidity in the chamber 10 with consequent risk of cementation, cracking and distortion of the timber 12. For the same reasons, even when the dehumidification evaporator 40 is in action, it is better to operate it only on one part of the air current passing through the outlet port 20 of the chamber 10, as illustrated in FIGS. 1B and 1C.

I claim:

1. In a drying plant for drying materials, particularly timber, by air circulation, comprising a drying chamber having air inlet and air outlet ports for the circulation of air in the chamber, and a refrigerating unit for the dehumidification of the air, said refrigerating unit comprising a refrigerant fluid circuit including a compressor, a fan for forcing inlet air into the drying chamber through the said inlet port, a dehumidification evaporator located in the outlet air flow from the outlet port, and a condenser located in the inlet air flow upstream of the inlet port to restore to the inlet air flow at least part of the heat extracted from the outlet air flow by said dehumidification evaporator, the improvement wherein the said refrigerating unit further comprises an auxiliary evaporator in said circuit exposed to the atmospheric air and valve means for switching said auxiliary evaporator into and out of the refrigerating fluid circuit whereby the refrigerating unit constitutes a heat pump absorbing heat from the atmospheric air when the auxiliary evaporator is switched into said circuit.

2. The plant defined in claim 1, comprising valve means by which said auxiliary evaporator is connectable in said refrigerant fluid circuit in substitution for the dehumidification evaporator, and wherein the outlet part of the drying chamber has associated therewith a first damper movable between a closed position in which substantially the whole of the air flow from the drying chamber passing through said outlet port is recyclable through the condenser and inlet port, and an open position in which part of said air flow is discharged to the outside through said auxiliary evaporator, said plant further including a second damper associated with air inlet side of the condenser, said second damper being movable between a closed position in which said inlet side of the condenser receives air only from the outlet port, and an open position in which the said condenser receives air also from the external atmosphere.

3. The plant defined in claim 2, comprising valve means by which said auxiliary evaporator is connectable in the refrigerant fluid circuit between the delivery port of the compressor and the condenser, while the dehumidification evaporator is also connected in said circuit, so that said auxiliary evaporator may act as a condenser dissipating heat to the atmosphere, thereby reducing heat restored by the firstmentioned condenser of the refrigerating unit to the air recycled into the chamber through the said inlet port.

4. The plant defined in claim 1, claim 2 or claim 3, wherein the refrigerating unit further includes a supplementary evaporator exposed to the atmospheric air, said supplementary evaporator being disposed so as to be traversed by the flow of air discharged to the outside when the said first damper is in its open position, and valve means by which said supplementary evaporator is connectable into the refrigerant fluid circuit in parallel with the auxiliary evaporator.

5. The plant defined in claim 1, wherein the refrigerant fluid is Freon 12.

6. The plant defined in claim 2, which further includes:
a cabinet containing said refrigerating unit,
means dividing the cabinet internally into a middle and two opposite end compartments, said cabinet being adjacent the drying chamber, and
the dehumidification evaporator being located in the middle compartment to obstruct part of the outlet port from the chamber, one of the external walls of said middle compartment having a window which communicates with the outside under the control of the second damper, and wherein:

the middle compartment communicates with a first of the two end compartments through the firstmentioned condenser, the fan being disposed so as to draw air from the said first compartment and direct it into the drying chamber through the inlet port;

the auxiliary evaporator is located in the second of the two end compartments, the latter having a window which communicates with the outside air, the first damper being movable to a position in which it puts the said second end compartment into communication with the portion of the outlet port of the chamber unobstructed by the dehumidification evaporator;

the said second end compartment also communicates with an air discharge duct through said auxiliary evaporator, the latter being equipped with a fan which draws air from said second compartment and discharges it into said discharge duct through the auxiliary evaporator.

7. The plant defined in claim 4 or claim 6, wherein the supplementary evaporator is also located in the said second end compartment and has an associated fan which in operation draws air from the said end compartment and discharges it into said discharge duct through the supplementary evaporator.

* * * * *